United States Patent [19]

Gaffard

[11] 4,146,307
[45] Mar. 27, 1979

[54] METHOD OF INCREASING THE LIGHT PRODUCED BY A LASER BEAM

[75] Inventor: Jean-Paul Gaffard, Fontainebleau, France

[73] Assignee: Compagnie Generale d'Electricite, Paris, France

[21] Appl. No.: 837,978

[22] Filed: Sep. 29, 1977

[30] Foreign Application Priority Data
Oct. 13, 1976 [FR] France .................................. 76 30744

[51] Int. Cl.² .............................................. G02F 1/29
[52] U.S. Cl. .................................... 350/285; 350/360
[58] Field of Search ............... 350/285, 360; 250/201, 250/202, 203; 356/5; 332/7.51

[56] References Cited

U.S. PATENT DOCUMENTS

| | | | |
|---|---|---|---|
| 3,698,793 | 10/1972 | Tellerman | 350/285 |
| 3,904,274 | 9/1975 | Feinleib | 350/285 |
| 3,967,899 | 7/1976 | O'Meara | 356/5 |
| 4,016,415 | 4/1977 | O'Meara | 350/360 |

*Primary Examiner*—William L. Sikes
*Attorney, Agent, or Firm*—Sughrue, Rothwell, Mion, Zinn and Macpeak

[57] ABSTRACT

The invention relates to a method for increasing the light produced by a laser beam on a target, consisting in reflecting this beam on a deformable mirror comprising several piezoelectric elements. The polarization voltage of each of the elements is successively increased by a predetermined DC voltage, this increase being maintained only if it corresponds to an increase in the light intensity diffused by the target. Application to the focussing of a data transmitting laser beam on an aerial.

3 Claims, 1 Drawing Figure

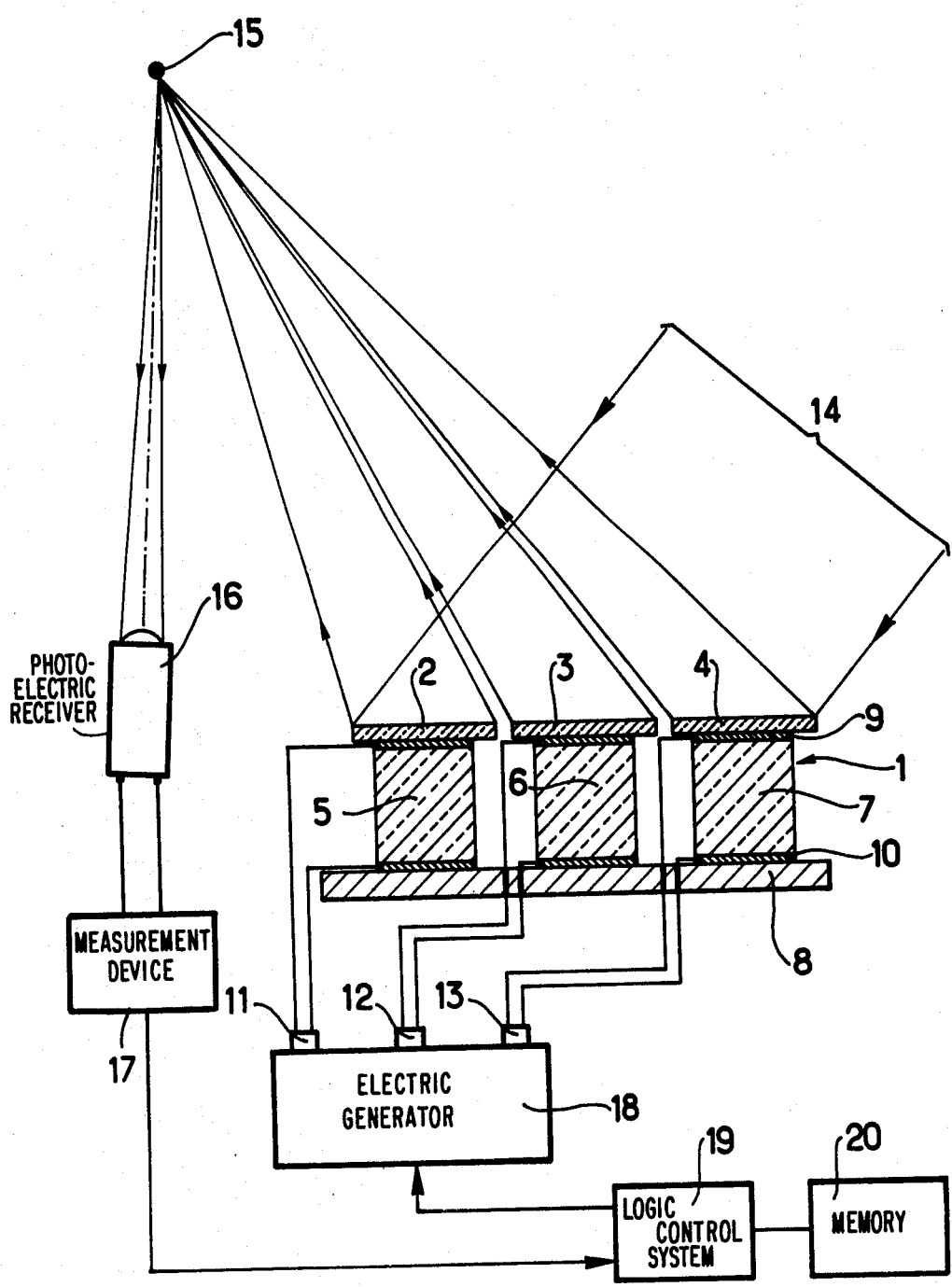

METHOD OF INCREASING THE LIGHT PRODUCED BY A LASER BEAM

FIELD OF THE INVENTION

The present invention relates to methods for increasing the illumination produced by a laser beam and more particularly to methods for increasing the illumination produced by a laser beam on a target. In the following text, "target" means any receiver of light energy capable of diffusing a part of the light which it receives.

It is known that in practice the wave front of a laser beam often has static or dynamic departures from a perfect plane. Further a laser beam propagating towards a target may be affected by phase distortions caused, for example, by atmospheric disturbances. These faults reduce the light intensity received by the target.

Methods have been conceived for increasing the useful intensity of these beams by correcting in real time the deformations of the wave front. These methods generally use a reflection of the beam on a mirror with a deformable reflecting surface, this mirror comprising a plurality of juxtaposed reflectors, integral with piezoelectric elements fixed on a rigid plate. By suitably energising the control electrodes of these elements, the reflecting surface of the mirror is deformed so as to correct the wave front of the beam reflected on the mirror.

A first known method consists in dividing the beam into a plurality of elementary beams whose phases are controlled by respective piezoelectric units. By successively applying a phase change to one group of elementary beams and another phase change to another group elementary beams and measuring the intensities of the successive beams reflected from the target after each phase change it is possible to calculate, as a function of the differences of intensity, the modificatons which need to be applied to the phase changes in order to compensate for the phase differences between the elementary beams. This method is repeated with phase changes thus modified until a satisfactory result is obtained. This method has the drawback of being complicated and requiring a computer to perform the calculations.

Another known method consists in applying modulation voltages at various frequencies on the piezoelectric elements of the deformable mirror and in detecting the energy reflected by means of a photoelectric receiver pointed towards the target. An electronic system comprising synchronous detectors tuned to the various modulation frequencies make it possible to determine the corrections to be effected on each of the reflectors of the deformable mirror. These corrections are effected automatically by servo-amplifiers associated with the piezoelectric elements. This method has the disadvantage of leading to a limitation of the number of elementary reflectors (about 30) of the deformable mirror to avoid intermodulation phenomena.

SUMMARY OF THE INVENTION

Preferred applications of the present invention mitigate these disadvantages of the known methods and implement a simpler method for increasing the illumination produced by a laser beam on a target. The method of this invention uses a deformable mirror which can have a large number of reflectors and allows both the phase distortions coming from the laser itself and those resulting from atmospheric turbulence to be corrected.

The present invention provides a method of increasing the illumination of a target by a laser beam, the method consisting in the steps of:

directing said beam to said target via a reflecting surface formed by a plurality, n, of juxtaposed reflectors, each reflector being integral with a corresponding piezoelectric element fixed to a reflector base plate and being provided with electrodes whereby each reflector is individually moveable by piezoelectric action of its piezoelectric element;

measuring the intensity of the light diffused by the target, and sequentially applying energising voltages to said piezoelectric elements to increase the measured light intensity; the sequential application of energising voltages proceeding in stages as follows:

in a first stage each piezoelectric element, in turn, has an energising voltage increment of predetermined magnitude and sign applied thereto and the light diffused by the target is monitored for a change in intensity, if the intensity is increased by the application of the said increment, the incremented value of the energisation voltage continues to be applied to the piezoelectric element and the sign of the increment is stored in a memory, while if the intensity is not increased by the application of said increment, an equal and opposite increment is applied so that the original value of the energisation voltage continues to be applied to the piezoelectric element and the sign of the said opposite increment is stored in a memory, the same procedure is repeated in subsequent stages after the first, with the sign of the initial increment applied to each piezoelectric element being the same as the sign stored in the memory during the previous stage for that piezoelectric element;

the number of successive stages being so chosen that the intensity measured at the end of the last stage is substantially equal to the intensity measured at the end of the last stage but one.

The invention is described hereinbelow by way of an illustration having no limiting character, with reference to the accompanying drawing in which the single figure shows schematically a device by means of which it is possible to implement the method according to the invention.

DESCRIPTION OF THE PREFERRED EMBODIMENT

This FIGURE shows in particular cross-section of an optical device 1, which comprises three juxtaposed reflectors 2, 3, 4 fixed respectively on piezoelectric elements 5, 6, 7 integral with a rigid plate 8, the number of the elements being much greater in practice. These piezoelectric elements can be constituted by quartz for example and are each provided with two electrodes. The element 7 thus comprises two eletrodes 9 and 10 connected to two terminals of an output 13 of an electric generator 18 which includes two other outputs 11 and 12 whose terminals are connected respectively to the electrodes of the elements 5 and 6. The generator 18 is capable of delivering DC voltages which are adjustable and independent from one another on the output 11, 12 and 13.

A laser beam 14 is reflected on the reflectors 2, 3 and 4 and is concentrated on a target 15. Contrary to what is shown in the FIGURE, the target is in practice situated at a great distance, the beams reflected by the reflectors being substantially parallel to one another. A photoelectric receiver 16 is disposed close to the device 1 and oriented so as to receive a fraction of the light diffused by the target 15. The receiver comprises two electric outputs connected to a measurement device 17 whose indications are representative of the intensity of the laser light diffused by the target 15.

A logic control system 19 connected to the measurement device 17 and to the generator 18 varies the voltage applied by the generator 18 to the piezoelectric elements 5, 6, 7. Lastly a memory 20 is connected to the system 19.

When an electric voltage is applied to the terminals of the two electrodes of a piezoelectric element of the device 1, a deformation (expansion or contraction) of the element concerned is caused which causes a movement of the reflector fixed on it. This movement slightly modifies the optical path of the light waves which are reflected on this reflector.

It is therefore understood that it is possible, by suitably energising the various elements of the device 1, to cancel the phase differences which may exist between the parts of the beam 14 which are reflected respectively on the various reflectors of the device 1.

These differences in phase can come from either a lack of coherence of the beam 14, or from inhomogeneities of the refractive index of the atmosphere through which the beam passes between the emission source and the reflecting surface of the device 1 and the target 15.

The energisation of the various elements of the device 1 is effected as follows:

At the outset, the piezoelectric elements 5, 6 and 7 of the device 1 are respectively energised by DC electric voltages V5, V6 and V7, these voltages often being zero in practice.

Firstly, the voltage V5 is made to undergo a variation by applying to it an elementary incremental value $\Delta V$, so as to bring the polarization voltage of the element 5 to $V5 + \Delta V$, the voltages V6 and V7 remaining unchanged. The increment $\Delta V$ is a predetermined positive or negative DC voltage.

This increment $\Delta V$ causes a modification in the interface state of the beams sent by the various reflectors onto the target. If this modification results in an increase of the illumination of the target (the interference then being constructive), the receiver 16 and the measurement device 17 detect an increase in the light intensity diffused by the target. The voltage $V5 + \Delta V$ is then maintained and the value $\Delta V$ of the increase is stored in the memory 20. If this modification in the state of interference produces, on the contrary, a reduction of the illumination of the target (destructive interference), the receiver 16 and the measurement device 17 detect a reduction in the intensity diffused by this target. The polarity of the increase $\Delta V$ is then changed and there is applied to the voltage $V5 + \Delta V$ an increase $-\Delta V$ in sign opposed to the preceding sign. The voltage of the element 5 is therefore brought to the value:

$$V5 + \Delta V - \Delta V = V5$$

and the new value $-\Delta V$ of the increase is stored in the memory 20.

Then the same operation is carried out on the element 6, bringing its energising voltage to $V6 + \Delta V$; this voltage is maintained if the intensity read on the device 17 increases, but it is brought to V6 if the intensity read decreases.

The same is then carried out on the element 7. This operation is therefore successively carried out, in a first stage, on all the elements of the system.

In a second stage, the voltages maintained on the various elements of the device are made to undergo successively variations identical to those of the first stage. Therefore there is applied to each piezoelectric element a voltage increment whose absolute value is equal to $\Delta V$ and whose sign corresponds to the sign of the increment memorized at the preceding stage. An extra increment in opposite sign is possibly applied if the first increment leads to a reduction of the intensity reflected by the target, the last increment applied being stored in a memory with its sign, thus replacing the increment previously stored in the memory.

If necessary, an identical third stage is carried out, and so on. The number of stages is such that the intensity measured on the device 17 will be substantially the same at the end of the last and of the last-but-one stages. In fact, the sequences of variation of voltges can theretically continue indefinitely. But it is observed that when the optimum adjustment is reached, the voltages applied to the piezoelectric elements are no longer modified, each element undergoing two successive increments of opposite sign whose total value is zero.

The predetermined voltage $\Delta V$ is the same in all the operations of the method is chosen in practice so that it corresponds to a movement of the mirror of the order of a fraction of the wavelength of the laser light. This voltage $\Delta V$ causes a variation in the phase of the light wave reflected on the mirror integral with the piezoelectric element to which the variation of the voltage has been applied. The phase variation which correspond to the predetermined voltage $\Delta V$ is called the correction step.

It is evident that when a large correction step is chosen, the number of stages of the method is relatively small, but the final intensity of the beam illumination the target can be substantially less than the maximum possible value (which corresponds to a zero phase shift between the parts of the beam which are reflected on the various reflectors of the optical device 1).

By way of an example, for an optical device comprising 100 elements, an intensity equal to 90% of the maximum intensity of the beam is obtained by adopting a correction step of 1.2 radians, this leading to performing 4 stages in the method. For a correction step of 0.8 radians, 5 stages must be performed, the final intensity being equal to substantially 95% of its maximum value. Lastly, for a correction step of 0.4 radians, 99% of the maximul intensity is obtained with 8 stages.

Of course, the succession of the operations of the various stages of the method can advantageously be effected automatically by means of electronic devices. If it is assumed that one of the operations described hereinabove, affecting an element can be effected in 5 microseconds, which seems to be compatible with the present state of the art, it appears that the total duration of implementing the method (i.e. the convergence time) lies between 2 and 4 milliseconds for the exampkes described hereinabove, this duration being sufficiently short to obtain an effective phase correction in practice.

The method described hereinabove can be improved by reducing progressively the absolute value of the increment $\Delta V$. Thus, it is possible to choose from the outset a relatively high increment for the first stages so as to converge rapidly towards a value fairly close to the maximum possible intensity of illuminating the target, then the reduce the absolute value of the increment from one stage to the next so as to obtain a value illumination closer to the maximum value. Thus, the advantages of large increments which allow a rapid convergence are combined with those of small increments which allow a much closer approach to the optimum value target illumination.

The method according to the present invention can be applied when it is required to concentrate a light beam on a distant target and in particular in the field of telecommunications to focus the energy of a data-transmitting light beam onto a receiving antenna.

Of course, the invention is in no way limited to the embodiments described and illustrated which have been given only by way of an example. In particular, the optical device with a deformable reflecting surface can comprise piezoelectric elements formed by a pile of discs made of a piezoelectric material, each disc being provided with two electrodes, the electrodes of each element being connected in parallel for example. Further, the deformable reflecting surface of the optical device can be formed by a single reflector instead of comprising a plurality of reflectors.

What is claimed is:

1. A method of increasing the illumination produced by a laser beam on a target, the method consisting in the steps of:

directing said beam on said target after reflection on a reflecting surface formed by a plurality, n, juxtaposed reflectors, the reflectors being integral respectively with n piezoelectric elements fixed on a plate and each provided with two electrodes;

measuring the intensity of the light diffused by said target;

applying electric energization voltages to said electrodes; then varying said energization voltages by predetermined increments of either sign followed by further increments determined as a function of the measured intensity of the laser beam reflected by the target, so as to reduce over successive stages, the phase differences between the beams reflected by the n reflectors towards the target, the improvement wherein said method comprises:

in a first stage, initially energizing the n elements respectively by DC voltages $V1, V2, \ldots Vn$, incrementing the voltage $V1$ of the element whose order is 1 by $\Delta V$, $\Delta V$ being a predetermined DC voltage of either sign, and maintaining the resultant voltage $V1 + \Delta V$ of said element whose order is 1 when the increment $+\Delta V$ causes an increase of said measured light intensity, and storing that increment $+\Delta V$ in a memory, further incrementing the voltage $V1 + \Delta V$ by $-\Delta V$ when the increment $+\Delta V$ causes a reduction in said measured light intensity, and then maintaining the energization of the element whose order is 1 at the resulting voltage $V1$ and storing the increment $-\Delta V$ in a memory;

incrementing the voltage $Vi$ of the element whose order is i by $+\Delta V$, and maintaining the energization thereof at the resultant voltage $Vi + \Delta V$ when the increment $+\Delta V$ applied to this element causes an increase in the measured light intensity, storing that increment $+\Delta V$ in a memory, further incrementing the voltage $Vi + \Delta V$ by $-\Delta V$ when the increment $+\Delta V$ applied to this element causes a reduction in the measured light intensity, then maintaining the energization of the element whose order is i at the resulting voltage $V1$, storing in a memory the increment $-\Delta V$, i being a whole number assuming successively the values $2, 3, \ldots n$; and repeating said steps for successive stages of order $2, 3, \ldots N$ such that in each step, the resulting voltages of the n elements undergo successively an initial increment identical in absolute value and in sign to the increment memorized during the preceding stage, this voltage then undergoes an extra increment of the same absolute value but of opposite sign to that memorized when the initial increment causes a reduction in the measured light intensity, the value of the increment previously stored in the memory being replaced in this case by that of the last increment;

and wherein N being chosen sufficiently large such that the intensities measured at the end of the stages whose order is N and N-1 have substantially the same value.

2. A method according to claim 1, wherein the initial voltages $V1, V2, \ldots Vn$ of the n elements are zero.

3. A method according to claim 1, wherein the absolute value of said increment is reduced between two successive stages.

* * * * *